[12] United States Patent  
Ishigaki

(10) Patent No.: US 7,896,313 B2  
(45) Date of Patent: Mar. 1, 2011

(54) LINEAR MOTION-TYPE GATE VALVE

(75) Inventor: Tsuneo Ishigaki, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 397 days.

(21) Appl. No.: 12/175,991

(22) Filed: Jul. 18, 2008

(65) Prior Publication Data

US 2009/0020719 A1 Jan. 22, 2009

(30) Foreign Application Priority Data

Jul. 20, 2007 (JP) ............... 2007-189204

(51) Int. Cl.
*F16K 3/00* (2006.01)
(52) U.S. Cl. ................... 251/326; 251/329
(58) Field of Classification Search ............. 251/193, 251/326, 328, 329
See application file for complete search history.

(56) References Cited

U.S. PATENT DOCUMENTS 3,330,530 A * 7/1967 Andrae ................ 251/158
3,333,814 A * 8/1967 Sargent ................ 251/203
3,352,535 A * 11/1967 Power .................. 251/204
3,722,857 A * 3/1973 Townsend ............. 251/203
5,101,861 A 4/1992 Deville et al.
7,011,294 B1 3/2006 Ehrne et al.
7,662,280 B1 * 2/2010 Cooney ................ 210/164

FOREIGN PATENT DOCUMENTS

| JP | 58-156781 | 9/1983 |
|----|-----------|--------|
| JP | 4-254071  | 9/1992 |
| JP | 2006-77984 | 3/2006 |

* cited by examiner

*Primary Examiner*—John K Fristoe, Jr.
(74) *Attorney, Agent, or Firm*—Oblon, Spivak, McClelland, Maier & Neustadt, L.L.P.

(57) ABSTRACT

A gate valve includes a valve plate for opening and closing a gas passageway, and an air cylinder and a shaft for linearly moving the valve plate between a main housing portion and a storage housing portion of a housing, and the air cylinder is arranged on the first lateral surface side of the housing in parallel with a moving direction of the valve plate, and the shaft is arranged so as to overlap with the valve plate in parallel with the moving direction. A tip end of the shaft is coupled with the valve plate at a position situated near a front end portion in the moving direction thereof.

16 Claims, 8 Drawing Sheets

LINEAR MOTION-TYPE GATE VALVE

TECHNICAL FIELD

The present invention relates to a gate valve which opens and closes a gas passageway while being installed between a vacuum chamber and a discharge pump in a semiconductor manufacture apparatus or the like, and more particularly to a linear motion-type gate valve configured to open and close the gas passageway by linearly moving a valve plate being housed inside a housing.

BACKGROUND ART

Hitherto, a gate valve of a linear motion-type, in which a gas passageway that penetrates through a housing is configured to be opened and closed by means of linearly moving a valve plate being housed inside the housing, is well known, as described in Patent Documents 1 through 3.

This kind of linear motion-type gate valve is generally configured to move the valve plate to a closing position for closing the gas passageway and an opening position for opening the gas passageway, by means of linearly driving the valve plate in a direction perpendicular to an axial line of the gas passageway with an actuator such as an air cylinder or the like.

However, in the hitherto known gate valve, since the actuator is arranged at one end side in a moving direction of the valve plate with respect to the housing, the actuator protrudes sideward of the housing in a large amount. It results in a problem of forming an obstruction for attaching peripheral devices, forming a disturbance for compact sizing the gate valve, or the like.

Patent Document 1: Japanese Unexamined Patent Application Publication No. 58-156781

Patent Document 2: Japanese Unexamined Patent Application Publication No. 4-2504071

Patent Document 3: Japanese Unexamined Patent Application Publication No. 2006-77984

DISCLOSURE OF INVENTION

An object of the present invention is to realize a compact sizing of a gate valve by constructing a linear motion-type gate valve such that a driving apparatus that drives a valve plate does not significantly protrude in a moving direction of the valve plate from a housing.

In order to achieve the object, a linear motion-type gate valve of the present invention includes a housing having a first lateral surface at one side and a second lateral surface at the other side in a direction of a first axial line, composed of a main housing portion where a gas passageway penetrates in the direction of the first axial line, and a storage housing portion being situated next to the main housing portion; a valve plate being arranged to be free to linearly advance and retreat along a second axial line being perpendicular to the first axial line in a plate chamber inside the housing, and occupying an advancing position inside the main housing portion when the gas passageway is closed, and occupying a retreating position inside the storage housing portion when the gas passageway is opened; and a driving apparatus for advancing and retreating the valve plate. The driving apparatus includes a shaft coupled with the valve plate and an actuator that drives the shaft, and the actuator and the shaft are arranged on the first lateral surface side of the housing in relation to the plate chamber, and the shaft is arranged so as to overlap with the valve plate in parallel with the second axial line, and a tip end of the shaft is coupled with the valve plate at a coupling portion provided at a position situated near a front end portion in an advancing and retreating direction axis of the valve plate.

In the present invention, preferably, the shaft is arranged at a center portion of the valve plate in a diameter direction of the valve plate.

Further, it is preferable that a coupling attachment overhanging toward the first lateral surface from the valve plate is provided in the coupling portion, and the shaft is coupled with the coupling attachment, and the coupling portion is configured to be positioned inside the main housing portion when the valve plate is positioned inside the storage housing portion.

In the present invention, the actuator is formed of an air cylinder, and the air cylinder includes a cylinder chamber that is formed in a direction of the second axial line at a position situated next to the plate chamber inside the storage housing portion, and a piston arranged in the cylinder chamber, and the shaft is coupled with the piston.

Alternatively, the actuator may be formed of an electric motor, a ball screw that is rotated by means of the electric motor, and a ball screw nut that is meshed with the ball screw. In this case the electric motor is arranged at a position situated near the main housing portion on a first lateral surface side of the storage housing portion, and the ball screw extends from the electric motor in parallel with the shaft, and the ball screw nut is coupled with the shaft via a connecting attachment.

Furthermore, in the present invention, the storage housing portion can be constructed to be separable from the main housing portion while continuing to house the valve plate and have the driving apparatus mounted therein.

In accordance with the present invention, since it is constructed such that the shaft and the actuator in the driving apparatus is arranged on the first lateral surface side of the housing in relation to the plate chamber, and entire or most part of these elements are housed within a lateral surface area of the housing, there is no possibility that the driving apparatus significantly protrudes sideward of the housing as in the hitherto known gate valve.

BEST MODES FOR CARRYING OUT THE INVENTION

Figure 1:
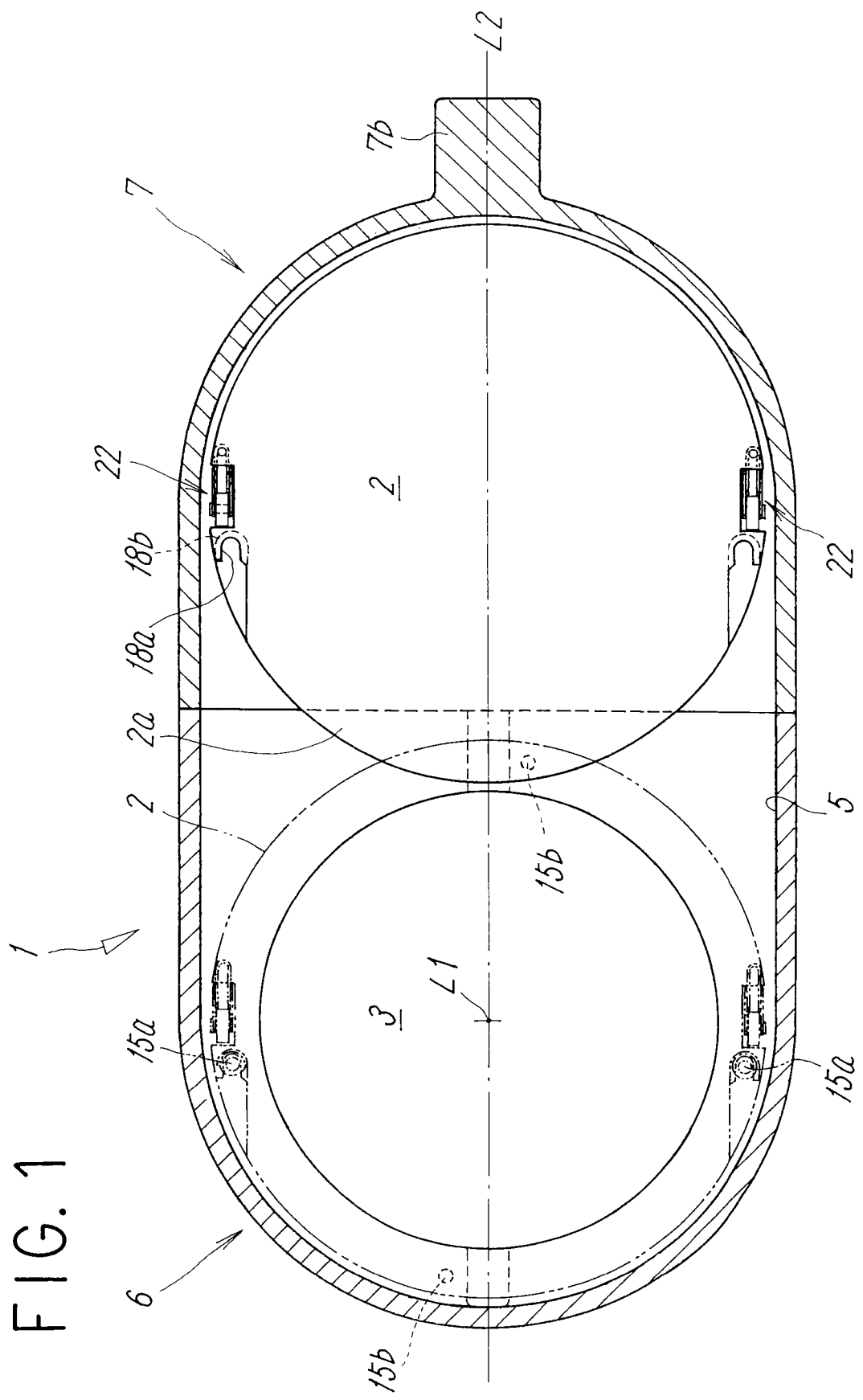
FIG. 1 is a transversal plan view illustrating a first embodiment of a gate valve according to the present invention, and is a cross-sectional view taken along a second axial line L2 of FIG. 3.

In FIG. 1 through FIG. 10, a first embodiment of a linear motion-type gate valve according to the present invention is illustrated. In this gate valve, as is clear from FIG. 1 through FIG. 4, a round-shaped valve plate 2 is housed inside a housing 1 provided with a gas passageway 3, and a driving apparatus 4 is attached to the housing 1, and the gas passageway 3 is configured to be opened and closed by means of linearly moving the valve plate 2 with the driving apparatus 4. For example, this gate valve is installed between a vacuum chamber and a discharge pump in a semiconductor manufacture apparatus, and is configured to open and close the gas passageway 3 connecting the vacuum chamber and the discharge pump.

The housing 1 is formed of metallic materials such as aluminum alloy, a stainless steel, or the like, and is composed of a main housing portion 6 where the round-hole shaped gas passageway 3 penetrates in a direction of a first axial line L1, and a storage housing portion 7 for housing the valve plate 2 when the gas passageway 3 is opened while being positioned adjacent to the main housing portion 6. The main housing portion 6 and the storage housing portion 7 are formed as separate parts having approximately U-shape in a planar view, and are coupled in a mutually separable manner by means of bolt fixing. Accordingly, an outer shape of the planar view of the housing 1 formed of the main housing portion 6 and the storage housing portion 7 has a shape in a manner such that two short sides of a laterally long rectangular shape which face each other are replaced by semicircles, and a dimension in a direction of a second axial line L2 (lateral direction) which is a moving direction of the valve plate 2 is longer than a dimension in a direction perpendicular thereto (longitudinal direction).

The first axial line L1 is a center axial line of the gas passageway 3. Further, the second axial line L2 is an axial line which is perpendicular to the first axial line L1, and extends in a diameter direction of the valve plate 2 in a center of an inside of the plate chamber 5 where the valve plate 2 is housed, and is perpendicular to the first axial line L1.

Furthermore, in the housing 1, a lateral surface of one side in the direction of the first axial line L1 (upper side in FIG. 3) is a first lateral surface 1a, and a lateral surface of the other side (lower side in FIG. 3) is a second lateral surface 1b.

The plate chamber 5 extends in a manner such that the plate chamber 5 straddles both housing portions 6 and 7 inside the housing 1, and the valve plate 2 is housed in a manner such that the same is displaceable in the direction of the first axial line L1 inside the plate chamber 5, and that the same is movable in a direction of the second axial line L2.

The main housing portion 6 is provided with a first side wall portion 6a that covers the plate chamber 5 from a first lateral surface 1a side, a second side wall portion 6b that covers the plate chamber 5 from a second lateral surface 1b side of an opposite side, and a peripheral wall portion 6c that surrounds other portion of an outer periphery of the plate chamber 5 except a portion that is allowed to communicate with the storage housing portion 7. Round-shaped passage holes 3a and 3b forming the gas passageway 3 are formed in the both side wall portions 6a and 6b in a concentric manner to each other, and a round-shaped valve seat portion 8 surrounding a periphery of the passage hole 3b are formed in an inner surface of the second side wall portion 6b.

Furthermore, the storage housing portion 7 is provided with a first side wall portion 7a that covers the plate chamber 5 from the first lateral surface 1a side, a second side wall portion 7b that covers the plate chamber 5 from the second lateral surface 1b side of the opposite side, and a peripheral wall portion 7c that surrounds other portion of an outer periphery of the plate chamber 5 except a portion that is allowed to communicate with the main housing portion 6.

Figure 4:
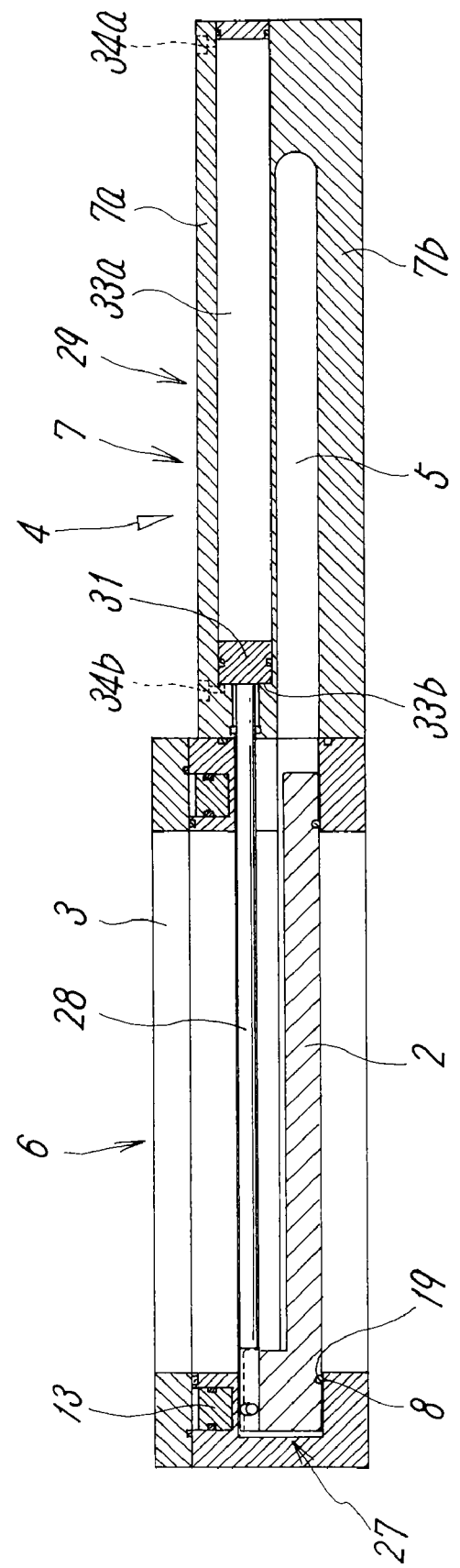
FIG. 4 is a cross-sectional view taken at the same position as that of FIG. 3, illustrating a state in which a gas passageway is closed.
Figure 5:
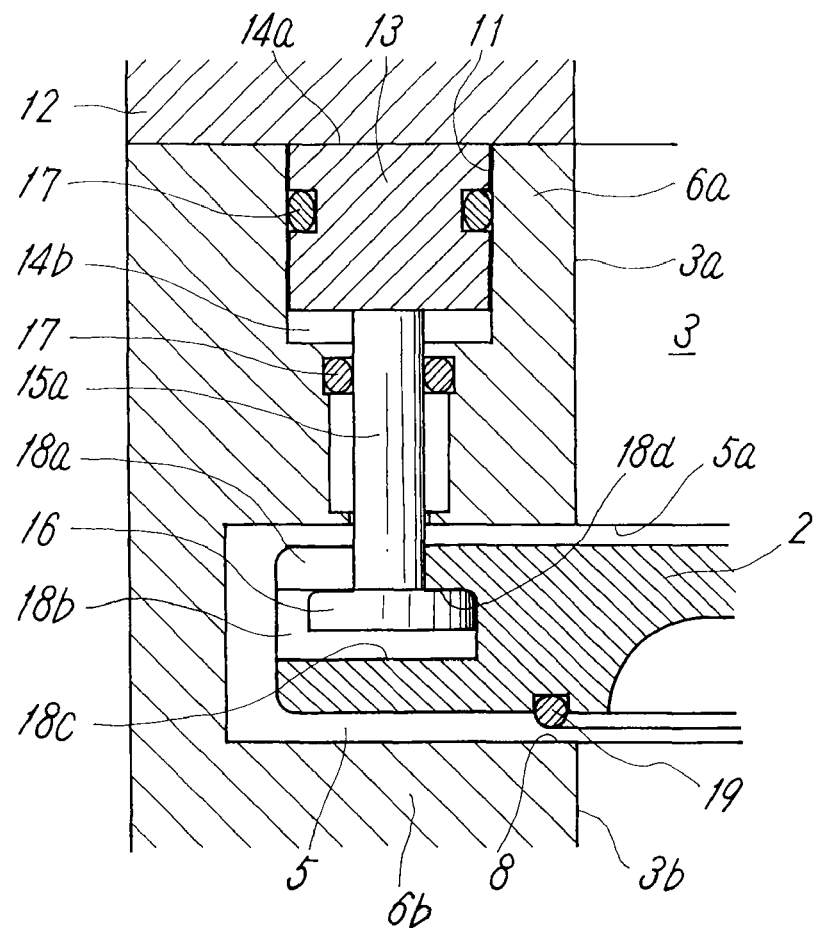
FIG. 5 is an important part enlarged view illustrating a part of a ring piston.

At an outer surface of the first side wall portion 6a of the main housing portion 6, as is clear from FIG. 5, an annular ring cylinder chamber 11 surrounding an outer periphery of the passage hole 3a is formed, and an annular flange 12 that is air-tightly covering an opening portion of the ring cylinder chamber 11 via a sealing member is attached. In addition, an annular ring piston 13 is housed in the ring cylinder chamber 11 in a manner such that the same is displaceable in the direction of the first axial line L1. Moreover, at both sides of the ring piston 13, each of two pressure chambers 14a and 14b for either pressing or pulling up the ring piston 13 is formed, and the ring piston 13 is configured to be reciprocation-driven in an upper-and-lower direction in FIG. 3 through FIG. 5 by means of alternately supplying and discharging pressurized air into the pressure chambers 14a and 14b from a not-illustrated air source.

Figure 6:
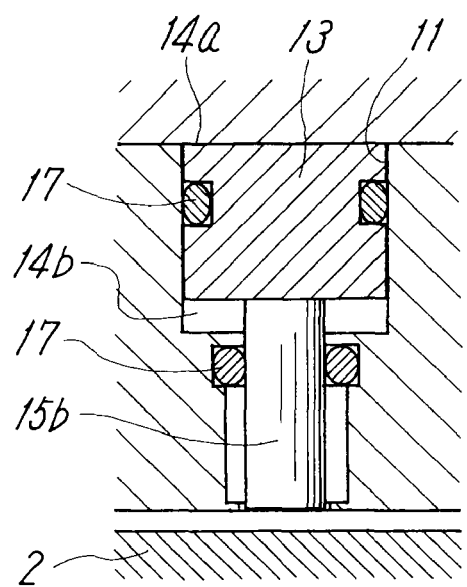
FIG. 6 is an important part enlarged view illustrating another part of the ring piston.

The ring piston 13 is provided with a plurality of piston shafts 15a and 15b protruding in the plate chamber 5 while penetrating through the first side wall portion 6a, as is clear from FIG. 5 and FIG. 6, and by means of displacing the valve plate 2 in a direction of the first axial line L1 while pressing and pulling up the valve plate 2 with the piston shafts 15a and 15b, the valve plate 2 is configured to have a state to close the gas passageway 3 or a state to be moved inside the storage housing portion 7 upon releasing the closed state of the gas passageway 3. Consequently, as illustrated in FIG. 5, a jaw portion 16 for pulling up the valve plate 2 is formed at a tip end of a part of the piston shafts 15a. In the illustrated example, each of two piston shafts 15a and each of two piston shafts 15b are alternately arranged in a circumferential direction being spaced apart at predetermined intervals as indicated by broken lines in FIG. 1, and the jaw portion 16 is formed at the tip end of each of the two first piston shafts 15a being disposed at positions facing each other via the second axial line L2. Accordingly, as illustrated in FIG. 6, the jaw portion 16 is not formed at the tip end of each of the two second piston shafts 15b located at the other positions. Further, a member indicated by a numeral 17 in the drawing is a sealing member for sealing an outer periphery of each of the ring piston 13, the piston shafts 15a and 15b.

In contrast, in the valve plate 2, as illustrated in FIG. 1 and FIG. 5, a shaft-fitting groove 18a having narrow groove width, to which the first piston shaft 15a is fittable, and a jaw-latching groove 18b having wide groove width, to which the jaw portion 16 is fittable and latchable are cut in from a front side of the valve plate 2 in a thin long manner in a state of being overlapped above and below at two places near an outer periphery of the valve plate 2 corresponding to the two first piston shafts 15a.

Further, when the valve plate 2 moves from an open position in the storage housing portion 7 (a position indicated by a solid line in FIG. 1) to a closed position in the main housing portion 6 (a position indicated by a chain line in FIG. 1) by being driven by means of the driving apparatus 4, as is clear from FIG. 5, each of the first piston shafts 15a and each of the jaw portions 16 are configured to be respectively fitted into each of the shaft-fitting grooves 18a and each of the jaw-latching grooves 18b. At this moment, respective tip ends of the second piston shafts 15b face an upper surface of the valve plate 2 to each other as illustrated in FIG. 6.

In this state, when the air is supplied into the pressure chamber 14a for pressing and the pressure chamber 14b for pulling up is opened to ambient air, the ring piston 13 descends and the jaw portion 16 of the first piston shaft 15a presses a groove bottom 18c of the jaw-latching groove 18b, and the second piston shaft 15b presses an upper surface of the valve plate 2. Thereby, the valve plate 2 is pressed down and an annular valve seal 19 being attached to a lower surface of the valve plate 2 is pressed to a valve seat portion 8, and the gas passageway 3 is closed.

Furthermore, when the air is supplied into the pressure chamber 14b for pulling up and the pressure chamber 14a for pressing is opened to the ambient air, as illustrated in FIG. 5, the ring piston 13 is raised and the jaw portion 16 at the tip end of the first piston shaft 15a is latched to a groove edge 18d of the jaw-latching groove 18b and pulls up the valve plate 2. Thereby, the valve seal 19 leaves from the valve seat portion 8 and the closed state of the gas passageway 3 is released. Consequently, the valve plate 2 is brought to a movable state toward the storage housing portion 7 by means of the driving apparatus 4.

The valve plate 2 has a circular disc shape, and as is clear from FIG. 1, two sets of the shaft-fitting grooves 18a and the jaw-latching grooves 18b are formed at positions facing each other across the second axial line L2, and two sets of floating mechanisms 22 that form the valve plate 2 into a floating state upon spacing the same apart from a chamber wall surface of the plate chamber 5 are provided at positions adjacent to the shaft-fitting grooves 18a and the jaw-latching grooves 18b.

Figure 7:
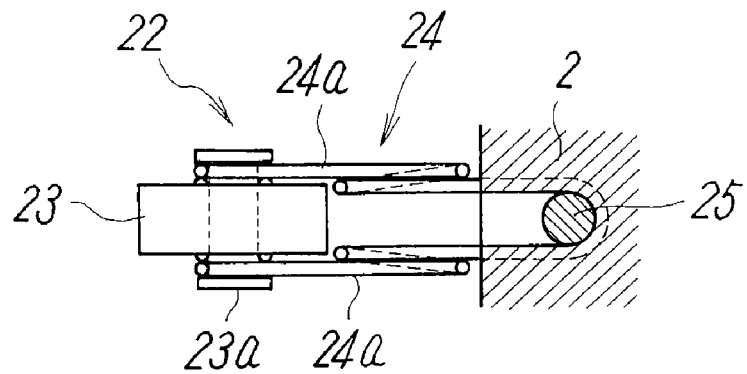
FIG. 7 is an enlarged plan view illustrating a floating mechanism of FIG. 1.
Figure 8:
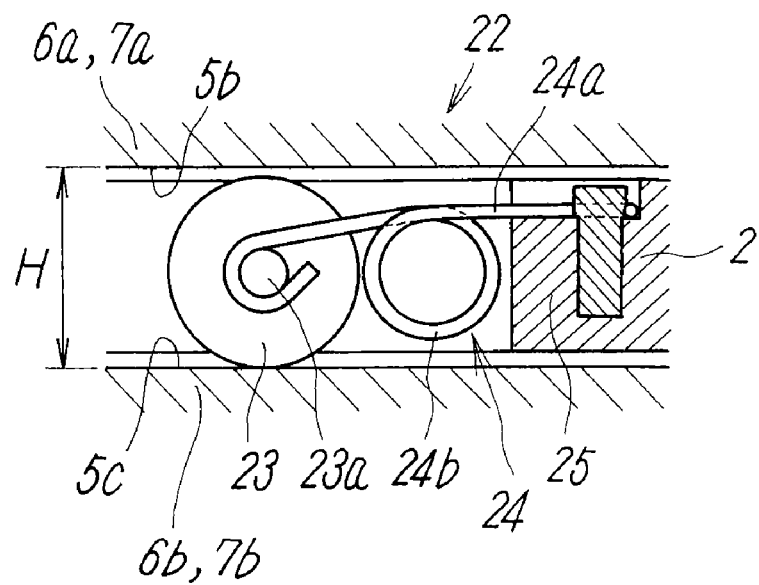
FIG. 8 is a cross-sectional view of FIG. 7.

The floating mechanism 22 is composed of a roller 23 and a spring member 24 that supports the valve plate 2 in the floating state via the roller 23, as illustrated in FIG. 7 and FIG. 8. Although a diameter of the roller 23 is slightly larger than a thickness of the valve plate 2, the same is slightly smaller than a distance between both chamber walls 5a and 5b of the plate chamber 5, namely a chamber height H. Further, the spring member 24 is formed of a wire, and includes a pair of spring pieces 24a having a turn of wire 24b in the middle portion thereof. Tip ends of respective spring pieces 24a are fixed to both ends of a roller shaft 23a in a condition of sandwiching the roller 23 between the spring pieces 24a, and a base end of both spring pieces 24a is fixed to a spring seat 25 of the valve plate 2. Furthermore, initial force capable of supporting the valve plate 2 in the floating state under a condition of that the roller 23 is in contact with a bottom surface of the plate chamber 5, namely a chamber wall surface 5c of the second side wall portions 6b and 7b side, is applied to the spring member 24.

Accordingly, the valve plate 2 keeps the floating state and there is no possibility that the same is displaced in a direction to come in contact with the chamber wall surface 5c of the plate chamber 5 unless the initial force having a strength of that of the spring member 24 or more is applied thereto in such a case that the valve plate 2 is pressed by the ring piston 13. Moreover, there is also no possibility that the valve plate 2 is displaced to the chamber wall surface 5b side of the first side wall portions 6a and 7a side unless the initial force having the strength of that of the spring member 24 or more is applied thereto. Consequently, the valve plate 2 is constantly kept in a stable posture while being spaced apart from the chamber wall surfaces 5b and 5c of the plate chamber 5, and the movement between the closed position and the open position is to be smoothly performed.

Figure 2:
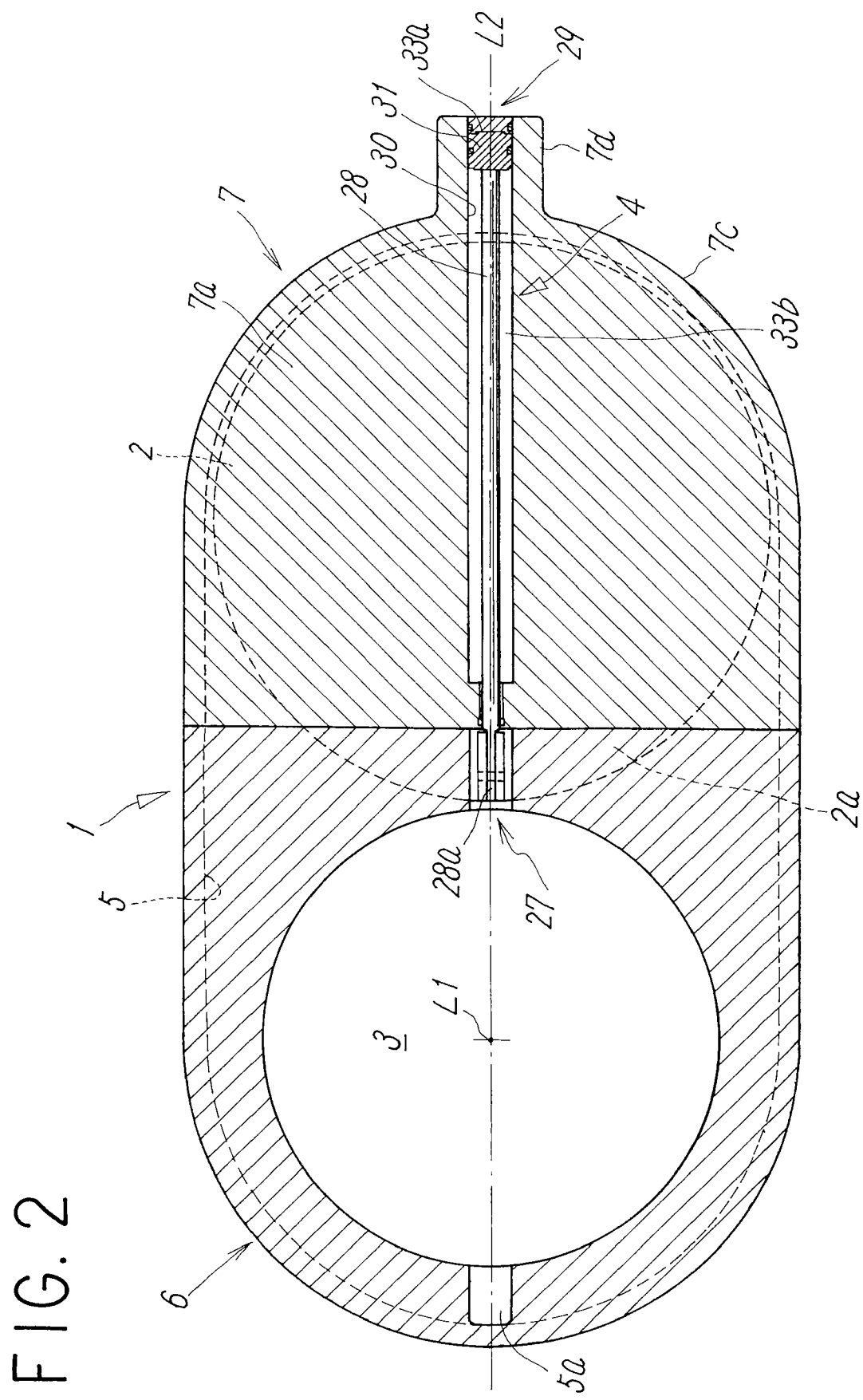
FIG. 2 is a transversal plan view illustrating the gate valve and is a cross-sectional view taken along a line II-II of FIG. 3.
Figure 3:
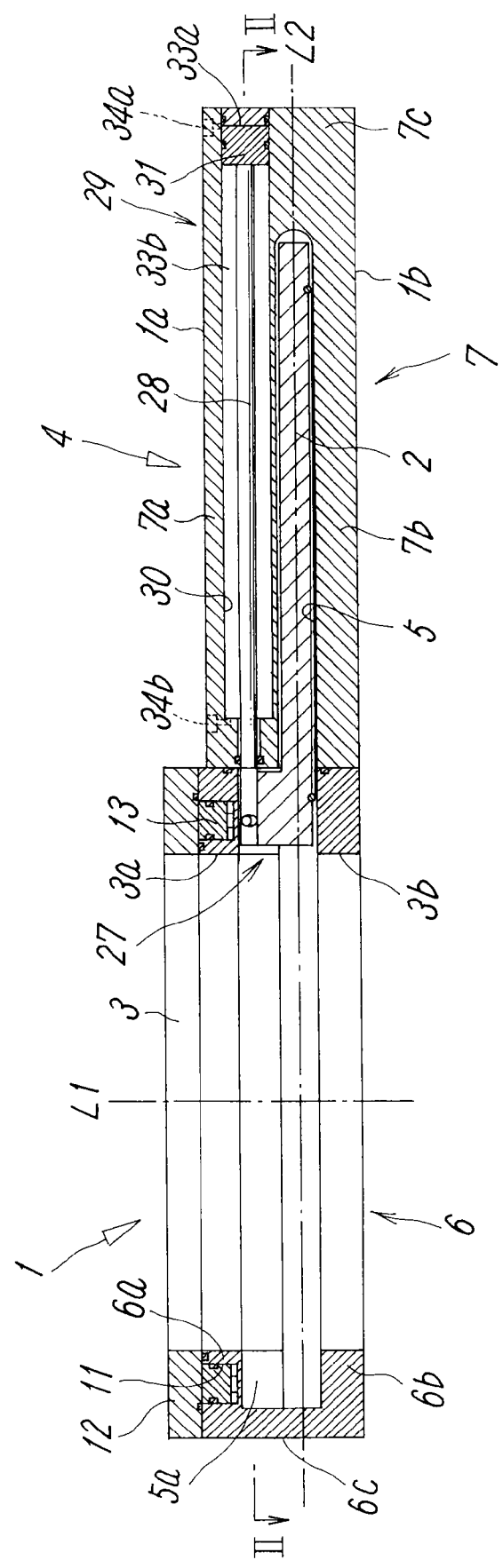
FIG. 3 is a cross-sectional view taken along the second axial line L2 of FIG. 2.

Further, a dimensional relationship between the main housing portion 6 and the storage housing portion 7 is set such that while the valve plate 2 is completely housed in the main housing portion 6 when the valve plate 2 is at an advancing position in the main housing portion 6 in order to close the gas passageway 3 (refer to a position indicated by a chain line in FIG. 1), as illustrated in FIG. 4, a part of the valve plate 2 protrudes from the storage housing portion 7 and is positioned inside the main housing portion 6 when the valve plate 2 retreats and is housed in the plate chamber 5 of the storage housing portion 7 in order to open the gas passageway 3, as illustrated in FIG. 1 through FIG. 3. Furthermore, a coupling portion 27 is formed at a center of a protruding portion 2a that protrudes from the storage housing portion 7, and the valve plate 2 is coupled with the shaft 28 of the driving apparatus 4 at the coupling portion 27.

The driving apparatus 4 is composed of the shaft 28 and the actuator 29 that drives the shaft 28, as illustrated in FIG. 2 through FIG. 4, and the shaft 28 and the actuator 29 are disposed in the housing 1 in a manner so as to occupy a position at the first lateral surface 1a side relative to the plate chamber 5.

The actuator 29 is constructed of an air cylinder (hereinafter, the actuator 29 is referred to as air cylinder 29). This air cylinder 29 is provided with a cylinder chamber 30 formed inside the first side wall portion 7a of the storage housing portion 7, and a piston 31 that is slidably arranged in the cylinder 30, and a base end portion of the shaft 28 is coupled with the piston 31, and a tip end portion of the shaft 28 is coupled with the valve plate 2 at the coupling portion 27.

The cylinder chamber 30 is provided in parallel with the second axial line L2 at a position adjacent to the plate chamber 5. A tip end portion of the cylinder chamber 30 reaches up to a position in the vicinity of the main housing portion 6, and a base end portion thereof reaches Lip to a position of an extending portion 7d that slightly extends from the peripheral wall portion 7c of the storage housing portion 7. This extending portion 7d is provided to compensate for the shortfall of a space in a case that the cylinder chamber 30 cannot completely be housed inside the first side wall portion 7a with respect to a moving stroke of the air cylinder 29. Accordingly, in general, an overhanging length of the extending portion 7d is extremely small compared to a length in a direction of the second axial line L2 of the storage housing portion 7, and the extending portion 7d is not always necessary to be provided in a case that the cylinder chamber 30 is completely housed inside the first side wall portion 7a.

In an inside of the cylinder chamber 30, a first pressure chamber 33a and a second pressure chamber 33b are partitioned and formed by means of the piston 31, and the pressure chambers 33a and 33b are individually allowed to communicate with a fist port 34a and a second port 34b, respectively, for supplying and discharging the pressurized air. The fist port 34a and the second port 34b can be provided at appropriate positions of the first side wall portion 7a, the peripheral wall portion 7c, or the extending portion 7d, of the storage housing portion 7.

Moreover, the shaft 28 is disposed so as to overlap with the valve plate 2 in the direction of the first axial line L1, in parallel with the valve plate 2 toward the moving direction of the valve plate 2. Accordingly, the shaft 28 is found to be also disposed in parallel with the second axial line L2. In the illustrated example, although the shaft 28 is disposed at an upper center of the valve plate 2 toward a diametrical direction of the valve plate 2, the same is not necessary to be disposed perfectly at the upper center, and the same may be slightly eccentrically located in a left-and-right direction.

Further, although the shaft 28 moves back and forth in a direction in parallel with the second axial line L2, the same is supported not to be displaced in a direction perpendicular to the second axial line L2, specifically, in a direction of the first axial line L1.

Accordingly, when the pressurized air is supplied to the first pressure chamber 33a through the first port 34a, and the second pressure chamber 33b is opened to the ambient air through the second port 34b in order to close the gas passageway 3 from a valve-open state illustrated in FIG. 2 and FIG. 3, the piston 31 and the shaft 28 linearly moves forth along the second axial line L2, and the valve plate 2 also linearly moves forth along therewith. Therefore, as illustrated in FIG. 4, the valve plate 2 moves into the main housing portion 6. Thereafter, the valve plate 2 is pressed by means of the ring piston 13, the valve seal 19 is pressed to the valve seat portion 8, and thereby the gas passageway 3 is closed. The movement thereof is as already described above.

Next, in FIG. 4, when the first pressure chamber 33a is opened to the ambient air through the first port 34a in the floating state in which the valve seal 19 of the valve plate 2 is spaced apart from the valve seat 8 in order to open the gas passageway 3, and the pressurized air is supplied to the second pressure chamber 33b through the second port 34b, the piston 31 and the shaft 28 linearly moves back along the second axial line L2, and the valve plate 2 also linearly moves back along therewith. Therefore, the valve plate 2 moves into the storage housing portion 7.

Figure 9:
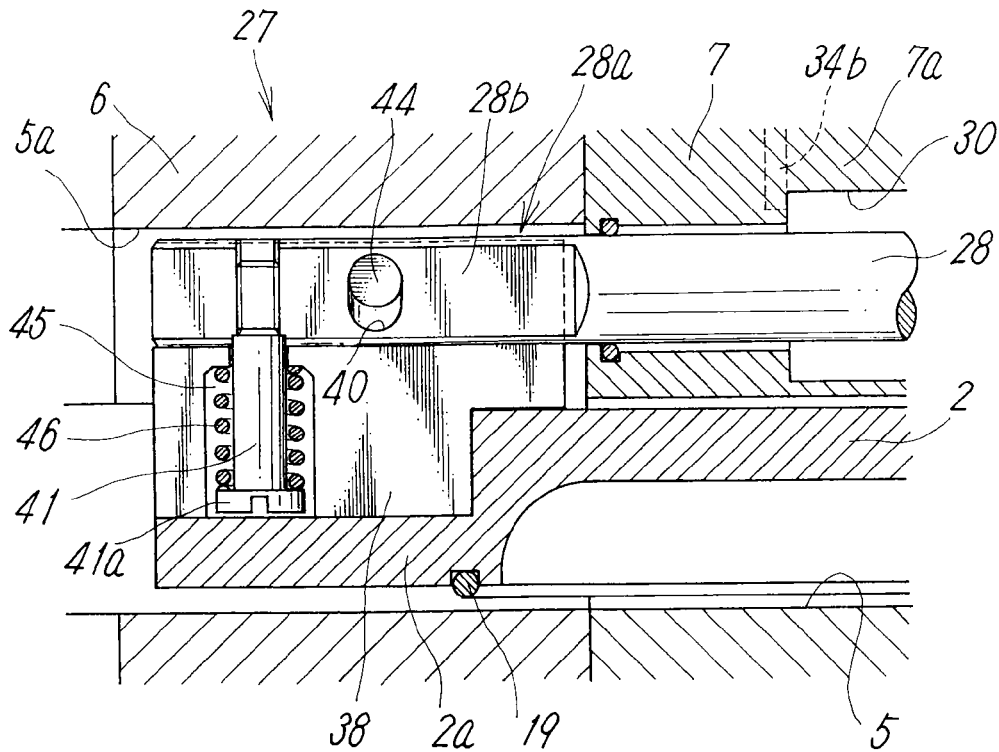
FIG. 9 is an enlarged side elevation illustrating a coupling portion of a shaft and a valve plate of FIG. 3.
Figure 10:
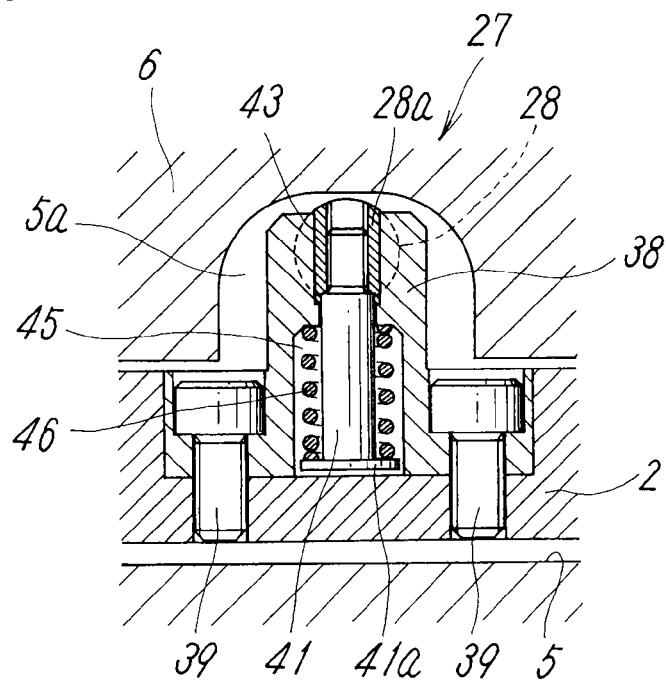
FIG. 10 is a cross-sectional view of FIG. 9.

The coupling portion 27 is provided to displaceably couple the valve plate 2 to the shaft 28 only in the direction of the first axial line L1, and is provided at a center portion of the protruding portion 2a that is positioned at a front end portion in the moving direction of the valve plate 2, namely at a position on the second axial line L2. The coupling portion 27 is provided with a coupling attachment 38 being fixed to the valve plate 2 with bolts 39 as illustrated in FIG. 9 and FIG. 10, and a flattened tip end portion 28a of the shaft 28 is coupled with the coupling attachment 38.

The tip end portion 28a of the shaft 28 is formed such that both left and right lateral surfaces thereof constitute flat surface portions 28b being in parallel with each other, and a long hole 40 for coupling, which is thin long in a direction of the first axial line L1, namely in a direction of the chamber height H of the plate chamber 5 is formed at a position that penetrates these flat surface portions 28b. A screw-rod shaped spring-receiving member 41 having a flange-shaped spring seat 41a at a tip end thereof is screwed at a position situated near a tip end of the shaft 28 in relation to the long hole 40 in a manner so as to extend toward the valve plate 2 side.

On the other hand, the coupling attachment 38 overhangs toward a side where the shaft 28 is positioned, namely the first lateral surface 1a side of the housing 1 from the valve plate 2. An approximately U-shaped coupling groove 43 whose left and right groove walls are formed to have a flat surface is formed at an upper end portion of the coupling attachment 38 in a manner so as to extend in an axial line direction of the shaft 28. The flattened tip end portion 28a of the shaft 28 is fitted into the coupling portion 43 in a state that a displacement in a left-and-right direction that is perpendicular to the first axial line L1 and a rotating direction is limited, whereas the same is relatively displaceable in the direction of the first axial line L1. Further, at the left and right groove walls of the coupling groove 43, both ends of the coupling pin 44 that is fitted to the long hole 40 of the shaft 28 are fixed, and a relative movement of the shaft 28 and the valve plate 2 in the direction of the second axial line L2 is limited by means of the coupling pin 44.

A hollow portion 45 that includes the spring-receiving member 41 is formed at a position corresponding to the spring-receiving member 41 of the coupling attachment 38, and a coil spring 46 is caused to intervene between a bottom wall of the hollow portion 45 and the spring seat 41a of the spring-receiving member 41 in a compressed condition. Furthermore, the valve plate 2 is pressed toward a shaft 28 side by means of spring force of the coil spring 46, and is brought to the floating state while being spaced apart from the chamber wall surface of the plate chamber 5, and is brought into contact with the shaft 28. At this moment, the coupling pin 44 is displaced together with the valve plate 2 and is positioned at an upper end portion of the long hole 40.

The valve plate 2 keeps such a positional relationship to the shaft 28 at a time other than the time when the valve plate 2 is closing the gas passageway 3 by being pressed by means of the ring piston 13, and moves between both housing portions 6 and 7 by being driven by means of the shaft 28 in this state.

When the valve plate 2 is pressed by means of the ring piston 13 for closing the gas passageway 3, the valve plate 2 is displaced in a direction in which the valve seal 19 comes in contact with the valve seat portion 8 upon being spaced apart from the shaft 28 while compressing the coil spring 46, and along with this movement, the coupling pin 44 is displaced downward in the long hole 40.

Accordingly, the coil spring 46 is a member for constructing a kind of floating mechanism for causing the valve plate 2 to be spaced apart from the chamber wall surface of the plate chamber 5. The valve plate 2 is kept in parallel with the shaft 28 while being constantly spaced apart from the chamber wall surface of the plate chamber 5 and is kept in the stable posture by cooperation of the coil spring 46 and the two sets of the floating mechanisms 22, at the time other than the time when the same is pressed toward the valve seat portion 8 side by means of the ring piston 13. Thereby, the valve plate 2 is to be able to be smoothly moved between the closed position and the open position.

Incidentally, at the first side wall portion 6a of the main housing portion 6, a concave portion 5a that curves to the first lateral surface 1a side for avoiding the coupling attachment 38 when the valve plate 2 is located at the closed position and the open position is formed at a position of the plate chamber 5 along the second axial line L2.

In the gate valve provided with the construction, in a case that the gas passageway 3 is closed from a state in which the valve plate 2 is located at a retreating position in the storage housing portion 7, illustrated in FIG. 1 and FIG. 3, the pressurized air is supplied to the first pressure chamber 33a of the air cylinder 29 in the driving apparatus 4, and the second pressure chamber 33b is opened to the ambient air. Consequently, the piston 31 and the shaft 28 linearly moves forth in the direction of the second axial line L2, and as illustrated in FIG. 4, the valve plate 2 moves into the main housing portion 6. At this moment, the valve plate 2 keeps a floating posture to be spaced apart from the chamber wall surface of the plate chamber 5 by the cooperation of the floating mechanisms 22 and the coil spring 46.

Thereafter, when the ring piston 13 is operated toward a side of the valve plate 2, the valve plate 2 is pressed by means of the first piston shaft 15a and the second piston shaft 15b, and is displaced toward a valve seat portion 8 side against the floating force of the floating mechanisms 22 and the coil spring 46. Thereby, the valve seal 19 on a lower surface of the valve plate 2 is pressed to the valve seal portion 8, and the gas passageway 3 is closed.

Furthermore, in a case that the gas passageway 3 is opened from the state illustrated in FIG. 4, firstly, the ring piston 13 is operated in a direction opposite to that in the case, and the valve plate 2 is pulled in a direction away from the valve seat portion 8 by means of the first piston shaft 15a. Consequently, the valve plate 2 is displaced in the direction by means of the pulling force and the floating force of the floating mechanisms 22 and the coil spring 46, and the valve seal 19 moves away from the valve seat portion 8. Thus, the vale plate 2 is brought to the floating state.

Next, in the state described above, when the first pressure chamber 33a of the air cylinder 29 is opened to the ambient air and the pressurized air is supplied to the second pressure chamber 33b, the piston 31 and the shaft 28 linearly retreat in the direction of the second axial line L2, and the vale plate 2 moves into the storage housing portion 7, as illustrated in FIG. 1 and FIG. 3.

The gate valve is constructed such that the shaft 28 and the air cylinder 29 in the driving apparatus 4 is arranged to have the above-described positional relationship with respect to the valve plate 2 and the housing 1, and entire or most part of these elements are housed within a lateral surface area of the housing 1. Accordingly, there is no possibility that the driving apparatus 4 significantly protrudes sideward of the housing 1 as in the hitherto known gate valve.

Moreover, the gate valve is configured to be able to separate the storage housing portion 7 from the main housing portion 6 in a state that the valve plate 2 is moved to the side of the storage housing portion 7 as illustrated in FIG. 3. Currently, the shaft 28 is coupled with the valve plate 2 in a state that the valve plate 2 remains housed in the storage housing portion 7, and the driving apparatus 4 also remains mounted on the storage housing portion 7. However, the coupling portion 27 is to be positioned at an outside of the storage housing portion 7. Accordingly, a housing assembly is constructed of the storage housing portion 7, the valve plate 2, and the driving apparatus 4, and the housing assembly is detachable to the main housing portion 6.

Figure 11:
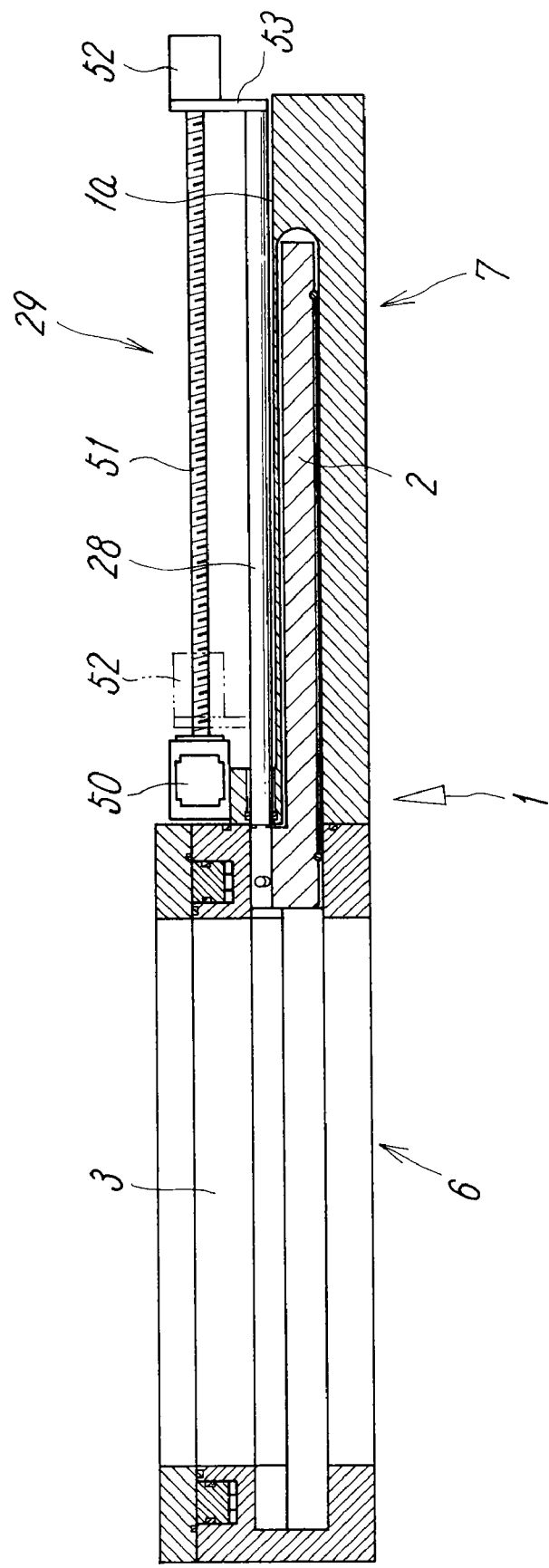
FIG. 11 is a cross-sectional view illustrating a second embodiment of a gate valve according to the present invention.

In FIG. 11, a second embodiment of the gate valve is illustrated. Different points of the gate valve of the second embodiment from that of the first embodiment are that the actuator 29 is constructed of an electric motor 50, a ball screw 51 that is rotated by means of the electric motor 50, and a ball screw nut 52 that is meshed with the ball screw 51, and that the shaft 28 is disposed at an outer surface of the storage housing portion 7.

The electric motor 50 is disposed on a first lateral surface 1a of the storage housing portion 7 at a position situated near the main housing portion 6, and the ball screw 51 extends from the electric motor 50 in the direction of the second axial line L2 (refer to FIG. 3) in parallel with the shaft 28, and the ball screw nut 52 is coupled with the shaft 28 via the connecting attachment 53.

In the illustrated example, a tip end of the ball screw 51 is freely supported and is not supported by mean of a bearing, however, the same can also be supported by means of a bearing upon attaching the bearing to the storage housing portion 7.

Further, the first lateral surface 1a of the storage housing portion 7 is configured to be lower than the main housing portion 6, and the actuator 29 and the shaft 28 are disposed at the portion being lowered in a manner not to protrude outside in relation to the main housing portion 6.

In the gate valve of the second embodiment, in a state that the valve plate 2 is in the open position as illustrated in FIG. 11, when the ball screw 51 is rotated in a normal direction by means of the electric motor 50 in order to close the gas passageway 3, the ball screw nut 52 linearly moves to the left in the drawing along the ball screw 51 from a position indicated by a solid line in the drawing, up to a position indicated by a chain line. Accordingly, the valve plate 2 also moves in the same direction along the second axial line L2 and occupies the closed position inside the main housing portion 6. Thereafter, the valve plate 2 is pressed by means of the ring piston 13 and the valve seal 19 is pressed to the valve seat portion 8, and the gas passageway 3 is closed. However, the operation described above is the same as that of the gate valve of the first embodiment.

Furthermore, when the valve plate 2 is moved to the open position inside the storage housing portion 7 from the closed position inside the main housing portion 6, the ball screw 51 is rotated in an opposite direction by means of the electric motor 50. Consequently, since the ball screw nut 52 moves from the position indicated by the chain line, up to the position indicated by the solid line in the drawing, the valve plate 2 also moves in the same direction and occupies the open position inside the storage housing potion 7.

The construction and operation of the second embodiment other than that described above are substantially identical of that in the first embodiment, and the same numerals as that in the first embodiment are attached to the same main components and the explanation is omitted.

The invention claimed is:

1. A linear motion-type gate valve comprising:
   a housing having a first lateral surface at one side and a second lateral surface at the other side in a direction of a first axial line, composed of a main housing portion where a gas passageway penetrates in the direction of the first axial line, and a storage housing portion being situated next to the main housing portion;
   a valve plate being arranged to be free to linearly advance and retreat along a second axial line being perpendicular to the first axial line in a plate chamber inside the housing, and occupying an advancing position inside the main housing portion when the gas passageway is closed, and occupying a retreating position inside the storage housing portion when the gas passageway is opened; and
   a driving apparatus for advancing and retreating the valve plate,
   wherein the driving apparatus includes a shaft coupled with the valve plate and an actuator that drives the shaft, and the actuator and the shaft are arranged on the first lateral surface side of the housing in relation to the plate chamber, and the shaft is arranged so as to overlap with the valve plate in parallel with the second axial line, wherein a tip end of the shaft is coupled with the valve plate at a coupling portion provided at a position situated near a front end portion in an advancing and retreating direction axis of the valve plate.

2. The gate valve according to claim 1, wherein the shaft is arranged at a center portion of the valve plate in a diameter direction of the valve plate.

3. The gate valve according to claim 2, wherein a coupling attachment overhanging toward the first lateral surface from the valve plate is provided in the coupling portion, and the shaft is coupled with the coupling attachment, and wherein the coupling portion is configured to be positioned inside the main housing portion when the valve plate is positioned inside the storage housing portion.

4. The gate valve according to claim 3, wherein the actuator is an air cylinder, and the air cylinder includes a cylinder chamber that is formed in a direction of the second axial line at a position situated next to the plate chamber inside the storage housing portion, and a piston arranged in the cylinder chamber, and wherein the shaft is coupled with the piston.

5. The gate valve according to claim 3, wherein the actuator is composed of an electric motor, a ball screw that is rotated by means of the electric motor, and a ball screw nut that is meshed with the ball screw, and wherein the electric motor is arranged at a position situated near the main housing portion on a first lateral surface of the storage housing portion, and wherein the ball screw extends from the electric motor in parallel with the shaft, and the ball screw nut is coupled with the shaft via a connecting attachment.

6. The gate valve according to claim 3, wherein the storage housing portion is separable from the main housing portion while continuing to house the valve plate and have the driving apparatus mounted therein.

7. The gate valve according to claim 2, wherein the actuator is an air cylinder, and the air cylinder includes a cylinder chamber that is formed in a direction of the second axial line at a position situated next to the plate chamber inside the storage housing portion, and a piston arranged in the cylinder chamber, and wherein the shaft is coupled with the piston.

8. The gate valve according to claim 2, wherein the actuator is composed of an electric motor, a ball screw that is rotated by means of the electric motor, and a ball screw nut that is meshed with the ball screw, and wherein the electric motor is arranged at a position situated near the main housing portion on a first lateral surface of the storage housing portion, and wherein the ball screw extends from the electric motor in parallel with the shaft, and the ball screw nut is coupled with the shaft via a connecting attachment.

9. The gate valve according to claim 2, wherein the storage housing portion is separable from the main housing portion while continuing to house the valve plate and have the driving apparatus mounted therein.

10. The gate valve according to claim 1, wherein a coupling attachment overhanging toward the first lateral surface from the valve plate is provided in the coupling portion, and the shaft is coupled with the coupling attachment, and wherein the coupling portion is configured to be positioned inside the main housing portion when the valve plate is positioned inside the storage housing portion.

11. The gate valve according to claim 10, wherein the actuator is an air cylinder, and the air cylinder includes a cylinder chamber that is formed in a direction of the second axial line at a position situated next to the plate chamber inside the storage housing portion, and a piston arranged in the cylinder chamber, and wherein the shaft is coupled with the piston.

12. The gate valve according to claim 10, wherein the actuator is composed of an electric motor, a ball screw that is rotated by means of the electric motor, and a ball screw nut that is meshed with the ball screw, and wherein the electric motor is arranged at a position situated near the main housing portion on a first lateral surface of the storage housing portion, and wherein the ball screw extends from the electric motor in parallel with the shaft, and the ball screw nut is coupled with the shaft via a connecting attachment.

13. The gate valve according to claim 10, wherein the storage housing portion is separable from the main housing portion while continuing to house the valve plate and have the driving apparatus mounted therein.

14. The gate valve according to claim 1, wherein the actuator is an air cylinder, and the air cylinder includes a cylinder chamber that is formed in a direction of the second axial line at a position situated next to the plate chamber inside the storage housing portion, and a piston arranged in the cylinder chamber, and wherein the shaft is coupled with the piston.

15. The gate valve according to claim 1, wherein the actuator is composed of an electric motor, a ball screw that is rotated by means of the electric motor, and a ball screw nut that is meshed with the ball screw, and wherein the electric motor is arranged at a position situated near the main housing portion on a first lateral surface of the storage housing portion, and wherein the ball screw extends from the electric motor in parallel with the shaft, and the ball screw nut is coupled with the shaft via a connecting attachment.

16. The gate valve according to claim 1, wherein the storage housing portion is separable from the main housing portion while continuing to house the valve plate and have the driving apparatus mounted therein.

* * * * *